(12) United States Patent
Sczuka et al.

(10) Patent No.: US 9,561,710 B2
(45) Date of Patent: Feb. 7, 2017

(54) ARTICULATION DEVICE BETWEEN ARMS OF A ROD ASSEMBLY OF A FOLDING ROOF

(71) Applicant: MAGNA Car Top Systems GmbH, Bietigheim-Bissingen (DE)

(72) Inventors: Markus Sczuka, Stuttgart (DE); Michael Wohlfahrth, Waldsee (DE); Frank Zehnder, Hemmingen (DE)

(73) Assignee: MAGNA Car Top Systems GmbH, Bietigheim-Bissingen (DE)

( * ) Notice: Subject to any disclaimer, the term of this patent is extended or adjusted under 35 U.S.C. 154(b) by 55 days.

(21) Appl. No.: 13/855,858

(22) Filed: Apr. 3, 2013

(65) Prior Publication Data

US 2013/0257091 A1  Oct. 3, 2013

(30) Foreign Application Priority Data

Apr. 3, 2012  (DE) .................... 20 2012 101 208 U

(51) Int. Cl.
*B60J 7/12* (2006.01)
*F16C 11/04* (2006.01)

(52) U.S. Cl.
CPC ............. *B60J 7/1226* (2013.01); *B60J 7/1265* (2013.01); *F16C 11/045* (2013.01)

(58) Field of Classification Search
CPC ............ B60J 7/12; B60J 7/1226; F16C 11/04; F16C 11/045

USPC ... 296/107.09, 109, 118, 121, 122; 403/119, 403/161, 164
See application file for complete search history.

(56) References Cited

U.S. PATENT DOCUMENTS

| | | | |
|---|---|---|---|
| 3,328,072 A | 6/1967 | Adamski | |
| 7,699,394 B2 * | 4/2010 | Humer | B60N 2/4885 297/216.12 |
| 2011/0002730 A1 * | 1/2011 | Zehnder | B60J 7/1226 403/26 |
| 2012/0230756 A1 * | 9/2012 | Shido | B60S 1/345 403/161 |

FOREIGN PATENT DOCUMENTS

| | | |
|---|---|---|
| DE | 295 16 619 U1 | 2/1996 |
| DE | 199 41 087 C2 | 3/2001 |
| DE | 10 2009 031 050 A1 | 1/2011 |

* cited by examiner

*Primary Examiner* — Jason S Daniels
(74) *Attorney, Agent, or Firm* — Jordan IP Law, LLC; Todd A. Vaughn

(57) ABSTRACT

Articulation device between arms of a rod assembly of a folding roof for a passenger vehicle, which roof may be adjusted between a closed position which spans a passenger compartment and an open position in which the roof may be stored in a rear space of the vehicle. The arms held in position by a rivet device which includes a blind rivet and a rivet shaft which extends through the arms.

15 Claims, 3 Drawing Sheets

ARTICULATION DEVICE BETWEEN ARMS OF A ROD ASSEMBLY OF A FOLDING ROOF

CROSS-REFERENCE TO RELATED APPLICATIONS

The present application claims priority under 35 U.S.C. §119 to German Patent Application No. 20 2012 101 208.1 (filed on Apr. 3, 2012), which is hereby incorporated by reference in its entirety.

TECHNICAL FIELD

Embodiments are related to an articulation device arranged between arms of a rod assembly of a folding roof for a passenger vehicle.

BACKGROUND

An articulation connection for a movable vehicle roof is known from DE 199 41 087 C2. This articulation connection is provided with a first bearing portion and a second bearing portion which are held together by a bearing pin which is constituted as a rivet. In order to reduce the friction in the articulation connection, articulation portions of the articulation connections are provided with a low-friction surface coating of aluminium oxide.

DE 295 16 619 U1 relates to a hinge for the articulated connection of two arms, a first arm and second arm, of a folding rod assembly for receiving a flexible roof of a cabriolet. The hinge comprises a pivot pin which is inserted into two mutually aligned holes of the two arms. The pivot pin is arranged in a rotationally secure manner in the hole of the first arm and constructed so as to be able to be rotated relative to the second arm. There is provided in this instance a bush which surrounds the pivot pin and which comprises a liquid crystal polymer base material. The bush is inserted into a hole of a metal bearing, which has a collar. The collar acts as a spacer disc between the arms.

U.S. Pat. No. 3,328,072 discloses a folding roof for a motor vehicle, which folding roof has a roof rod assembly. The roof rod assembly comprises a control arm, a transverse roof bow and a main arm which are assembled on a common bearing. The main arm, when viewed in the transverse direction of the vehicle, is provided with two adjacent but spaced-apart arm elements, between which the control arm is mounted with a bearing portion. A rivet connects the control arm, transverse roof bow and main arm, there being inserted into the hole of the control arm a bush of flexible material, on which two spacer collars are provided. They bring about a defined spacing between the control arm and the arm elements of the main arm.

An articulation device of the generic type is also known from DE 10 2009 031 050 A1. In this system, arms of a rod assembly of a folding roof are held together by a rivet device. Between the rivet shaft of a rivet and the first and second bearing holes, there extends a bearing sleeve, which is in abutment by a first collar-like stop with a first end face of the first arm. A second circular stop is provided on the bearing sleeve with spacing from the first stop. The bearing holes of the arms have different diameters. Bearing sleeve portions of a rivet shaft are also constructed accordingly. First and second bearing bushes are provided between the bearing sleeve portions. The second bearing bush has a first and second radial collar and is formed in that it initially has a cylindrical shape and is then brought into a radial shape by axial movement of the first collar-like stop of the bearing sleeve.

SUMMARY

Embodiments are related to an articulation device between arms of a rod assembly of a folding roof for a passenger vehicle, which articulation device advantageously provides enhanced functionality, that is to say, ease of operation, secure connection, simpler assembly and increased force absorption.

In accordance with embodiments, an articulation device is provided that includes at least one of: a blind rivet and a rivet shaft which extends through holes of first and second arms, and a first arm having a substantially cylindrical bearing connection piece which has a hole and which extends through a bearing hole of a second arm, the blind rivet being in abutment against a stop of the second arm by a cylindrical collar of a rivet sleeve by a securing disc, and a gudgeon head of the blind rivet being moved towards a shaft stop in the hole of the bearing connection piece.

In accordance with embodiments, an articulation device is arranged between first and second arms of a vehicle roof, the vehicle roof being configured for moveable adjustment between a closed position which spans a passenger compartment of the passenger vehicle and an open position which exposes the passenger compartment, the articulation device including at least one of: a rivet device configured to support the first arm and the second arm, the rivet device comprising a rivet sleeve, a securing disc, a blind rivet and a rivet shaft which extends through holes of the first arm and the second arm, respectively, the blind rivet having a collar configured to abut a stop of the second arm by way of a collar of the rivet sleeve and the securing disc, the blind rivet having a gudgeon head configured for movement in a direction towards a shaft stop in the hole of a bearing connection piece of the first arm.

In accordance with embodiments, a vehicle roof includes at least one of: a first arm having a bearing connection piece with a hole; a second arm having a stop and a bearing hole through which the bearing connection piece is configured to extend therethrough; and a rivet device configured to support the first arm and the second arm, the rivet device comprising a blind rivet and a rivet shaft which extends through the first arm and the second arm, respectively, the blind rivet having a collar configured to abut the stop by way of a collar of a rivet sleeve and a securing disc, the blind rivet having a gudgeon head configured for movement in a direction towards a shaft stop in the hole of the bearing connection piece.

In accordance with embodiments, a vehicle roof includes at least one of: a rod assembly configured to permit a moveable adjustment of the vehicle roof between a closed position which spans a passenger compartment of the vehicle and an open position which exposes the passenger compartment, the rod assembly including at least one articulation device having: a first arm having a bearing connection piece; a second arm having a stop and a bearing hole through which the bearing connection piece is configured to extend therethrough; and a rivet device configured to support the first arm and the second arm, the rivet device comprising a blind rivet and a rivet shaft which extends through the first arm and the second arm, respectively, the blind rivet having a collar configured to abut the stop and a gudgeon head configured for movement in a direction towards a shaft stop in the bearing connection piece.

In accordance with embodiments, a vehicle includes at least one of: a roof; a rod assembly operatively configured to permit a moveable adjustment of the roof between a closed position which spans a passenger compartment of the vehicle and an open position which exposes the passenger compartment, the rod assembly including at least one articulation device having: a first arm having a bearing connection piece; a second arm having a stop and a bearing hole through which the bearing connection piece is configured to extend therethrough; and a rivet device configured to support the first arm and the second arm, the rivet device comprising a blind rivet and a rivet shaft which extends through the first arm and the second arm, respectively, the blind rivet having a collar configured to abut the stop and a gudgeon head configured for movement in a direction towards a shaft stop in the bearing connection piece.

In accordance with embodiments, the arms are constructed as cast components and the bearing pin is produced in a single casting operation with one of the arms.

The advantages which are achieved in accordance with embodiments are evident in that the articulation device for the arms of the rod assembly of the folding roof, as a result of the rivet and the bearing bush with the stops, may be moved in an exemplary, that is to say, also rattle-free manner. The high force-absorption and service-life and simple structural implementation of the articulation device, however, must be emphasised. The use of the blind rivet for the rivet connection contributes to the simple assembly and defined formation of the expansion as a shaft stop.

Bearing bushes in the bearing hole support the ease of operation of the arms of the articulation device and they are further cost-effective components. In accordance with embodiments, the two bearing bushes have substantially the same dimensions.

Finally, the bearing bushes may comprise a polymer, metal, composite, or any combination thereof, or another suitable material having appropriate bearing characteristics.

DRAWINGS

Embodiments are illustrated in the drawings and are explained in more detail in the description below:

DESCRIPTION

Figure 1:
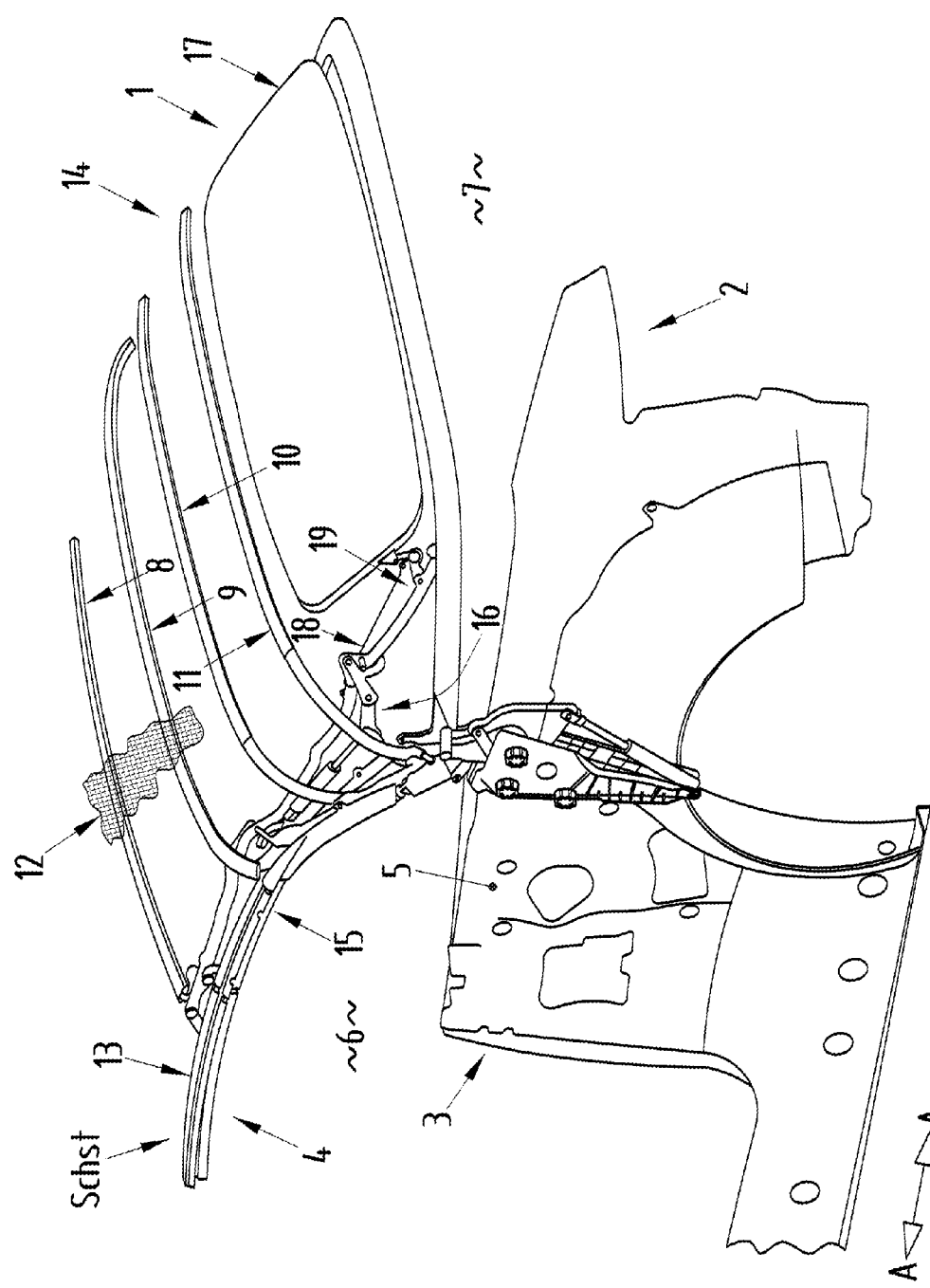
FIG. 1 illustrates a partially oblique view, viewed from the rear left, of a passenger vehicle having articulation devices of a rod assembly for a folding roof of a passenger vehicle in accordance with embodiments.

As illustrated in FIG. 1, a passenger vehicle 1 has a structure 2 having a base member 3 and a folding roof 4. The base member 3 which has a wall structure 5, for example, of sheet metal, carries the folding roof 4, which may be assembled and moved from a closed position Schst which spans a passenger compartment 6 into an open position (not illustrated) recessed in a storage space 7.

The roof 4 is provided with a plurality of roof bows 8, 9, 10 and 11 which extend transversely relative to the vehicle longitudinal direction A-A. The roof bows, 8, 9, 10 and 11, at least in the closed position Schst of the roof 4, support a roof cover 12 and cooperate with arm systems 15 of a rod assembly 16 that extend at longitudinal sides 13, 14 of the roof 4. The roof bow 11 delimits an upper edge of a rear window 17. The rod assembly 16 comprises one or more articulation devices 18, 19, which have first and second arms 22, 122 and 23, 124 which may be moved in a relative manner (FIG. 2).

Figure 2:
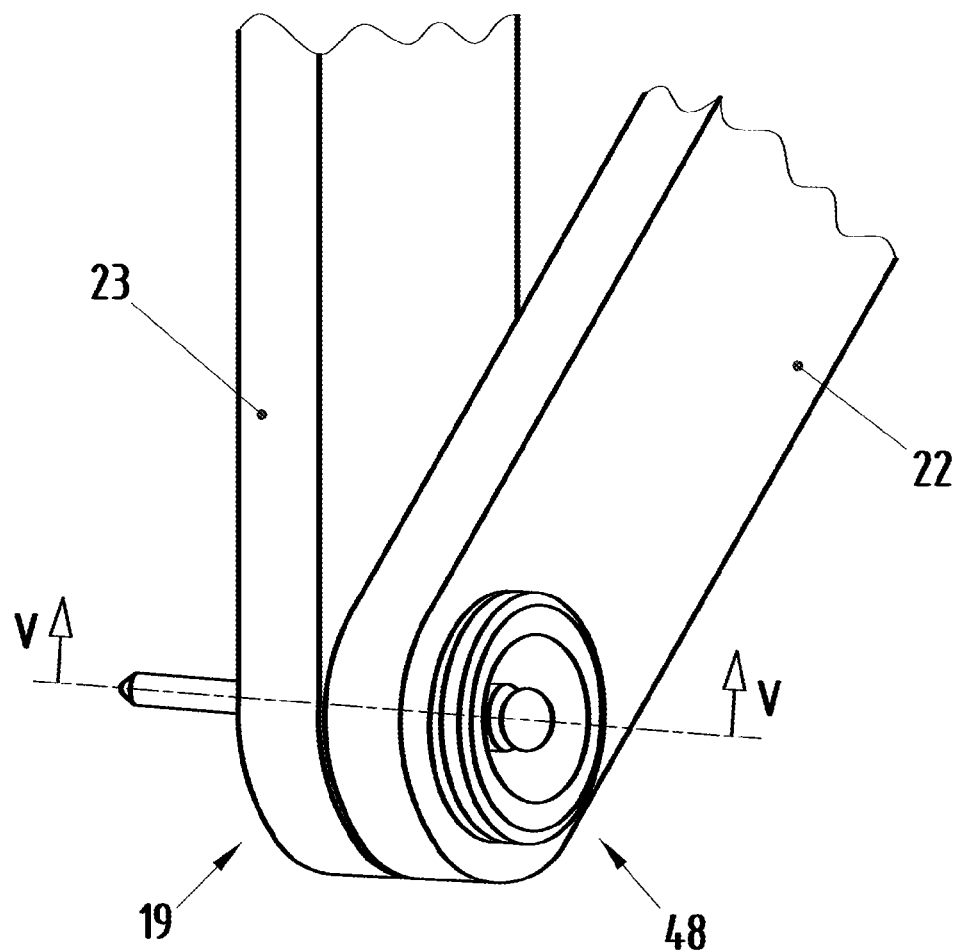
FIG. 2 illustrates an oblique view of an articulation device of the rod assembly of FIG. 1.

As illustrated in FIG. 2, the first and the second arms 22 and 23 of the articulation device 19 are held in position using a rivet device 48.

Figure 3:
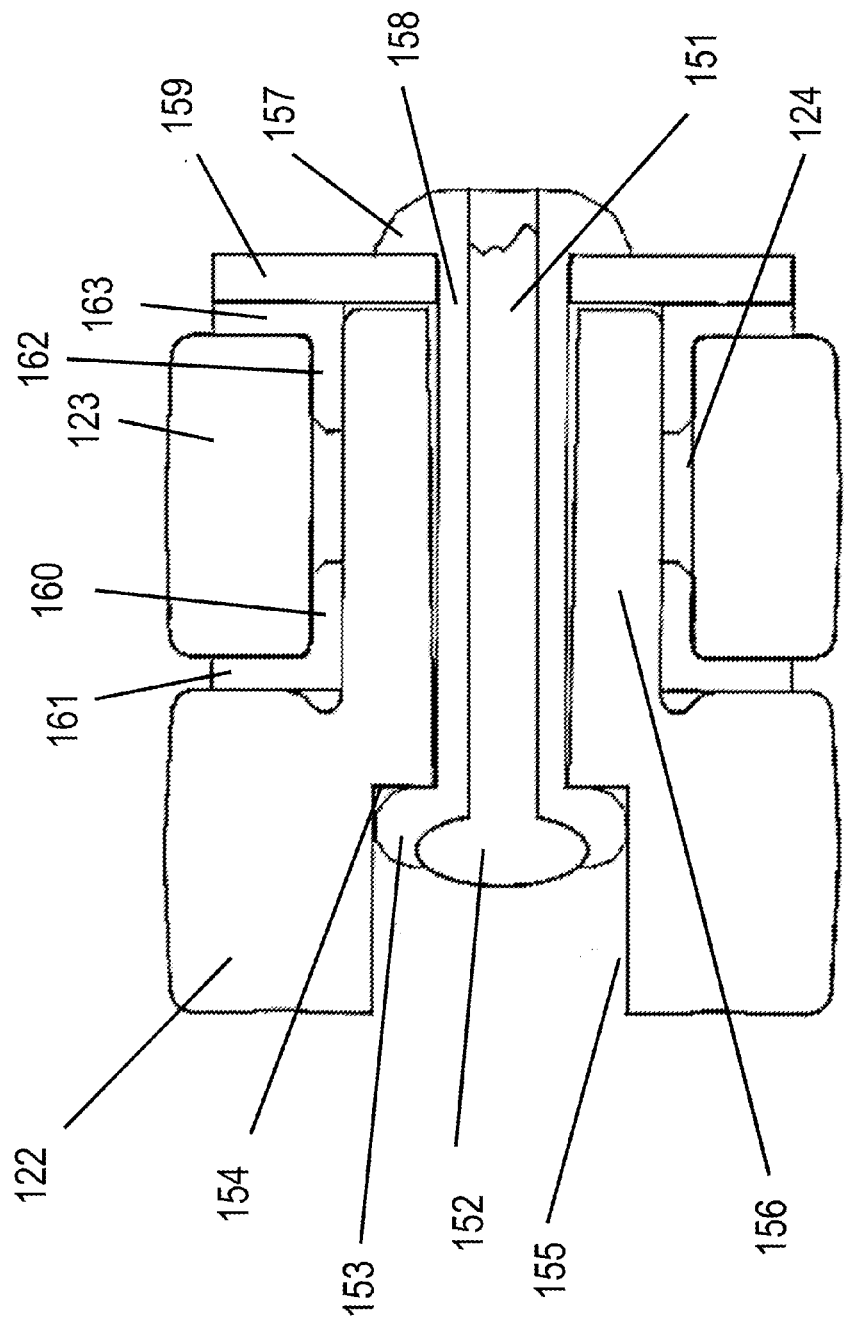
FIG. 3 illustrates a schematic section along line V-V of FIG. 2 of the articulation device drawn to an enlarged scale.

As illustrated in FIG. 3, a schematic section along the line V-V of FIG. 2 of the articulation device is provided in accordance with embodiments, drawn to an enlarged scale. The rivet device 48 has a blind rivet 151 which comprises a rivet shaft which constructed as a rivet sleeve 158 and a gudgeon having a gudgeon head 152.

A first arm 122 has a substantially cylindrical bearing connection piece 156 having a hole, the bearing connection piece 156 extending through a bearing hole 124 of a second arm 123 and the blind rivet 151 being in abutment against a stop of the second arm 123 by way of a cylindrical collar 157 of a rivet sleeve 158 by way of a securing disc 159. The gudgeon head 152 of the blind rivet is movable towards a shaft stop 154 in the hole 155 of the bearing connection piece 156. The gudgeon head 152 is supported by way of a radial expansion 153 of the rivet sleeve 158 on the shaft stop 154 in a stepped hole 155 of the bearing connection piece 156.

In accordance with embodiments, the securing disc 159, the bearing connection piece and the shaft stop 154 are constructed in the hole of the bearing connection piece 156 in such a manner that the first arm 122 and the second arm 123 may be selectively moveably adjusted relative to each other.

In accordance with embodiments, there are provided between the bearing connection piece 156 of the first arm 122 and the bearing hole 124 of the second arm 123, a first bearing bush 160 and a second bearing bush 162. The first bearing bush 160 has a radial collar 161 which is provided between the first arm 122 and the second arm 123, and the second bearing bush 162 having a radial collar 163 which is provided between the second arm 123 and the securing disc 159 of the blind rivet 151.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

1 Passenger vehicle
2 Structure
3 Base member
4 Folding roof, roof
5 Wall structure
6 Passenger compartment
7 Storage space
8, 9, 10, 11 Roof bow
12 Roof cover
13, 14 Longitudinal sides of the roof
15 Arm system
16 Rod assembly
17 Rear window 18, 19 Articulation devices
22, 23 Arms
48 Rivet device
122, 123 Arms
124 Bearing hole
151 Blind rivet
152 Gudgeon head of a blind rivet
153 Radial expansion of a rivet sleeve
154 Shaft stop
155 Hole of a bearing connection piece
156 Bearing connection piece
157 Collar
158 Rivet sleeve
159 Securing disc
160 Bearing bush
161 Radial collar of a bearing bush
162 Bearing bush
163 Radial collar of a bearing bush

What is claimed is:

1. An articulation device arranged between first and second arms of a vehicle roof, the vehicle roof being configured for moveable adjustment between a closed position which spans a passenger compartment of the vehicle and an open position which exposes the passenger compartment, the articulation device comprising:
a rivet device configured to support the first arm and the second arm, the rivet device comprising a rivet sleeve, a securing disc, a blind rivet and a rivet shaft which extends through holes of the first arm and the second arm, respectively, the blind rivet having a collar configured to abut a stop of the second arm by way of a collar of the rivet sleeve and the securing disc, the blind rivet having a gudgeon head configured for movement in a direction towards a shaft stop in the hole of a bearing connection piece of the first arm; and
first and second bearing bushes provided between the bearing connection piece of the first arm and the bearing hole of the second arm, wherein the first and second bearing bushes have substantially the same structural dimensions.

2. The articulation device of claim 1, wherein the arm comprises a cast component and the bearing connection piece is produced in a single casting operation with the arm.

3. The articulation device of claim 1, wherein the gudgeon head is supported on the shaft stop in a stepped hole of the bearing connection piece by way of a radial expansion of the rivet sleeve.

4. The articulation device of claim 1, wherein the securing disc, the bearing connection piece and the shaft stop are constructed in the hole of the bearing connection piece in such a manner that the first arm and the second arm are selectively adjustable relative to each other.

5. The articulation device of claim 1, wherein the first bearing bush has a radial collar provided between the first arm and the second arm.

6. The articulation device of claim 1, wherein the second bearing bush has a radial collar provided between the second arm and the securing disc of the blind rivet.

7. The articulation device of claim 1, wherein the first and second bearing bushes each comprise at least one of a polymer material, a metal material, a composite material, and combinations thereof.

8. A vehicle roof, comprising:
a rod assembly operatively configured to permit a moveable adjustment of the vehicle roof between a closed position which spans a passenger compartment of the vehicle and an open position which exposes the passenger compartment, the rod assembly including at least one articulation device having:
a first arm having a bearing connection piece;
a second arm having a stop and a bearing hole through which the bearing connection piece is configured to extend therethrough;
a rivet device configured to support the first arm and the second arm, the rivet device comprising a blind rivet and a rivet shaft which extends through the first arm and the second arm, respectively, the blind rivet having a collar configured to abut the stop and a gudgeon head configured for movement in a direction towards a shaft stop in the bearing connection piece; and
first and second bearing bushes provided between the bearing connection piece of the first arm and the bearing hole of the second arm, wherein the first and second bearing bushes have substantially the same structural dimensions.

9. The vehicle roof of claim 8, wherein the arm comprises a cast component and the bearing connection piece is produced in a single casting operation with the arm.

10. The vehicle roof of claim 8, wherein the gudgeon head is supported on the shaft in a stepped hole of the bearing connection piece.

11. The vehicle roof of claim 8, wherein the securing disc, the bearing connection piece and the shaft stop are constructed in the hole of the bearing connection piece in such a manner that the first arm and the second arm are selectively adjustable relative to each other.

12. The vehicle roof of claim 8, wherein the first bearing bush has a radial collar provided between the first arm and the second arm.

13. The vehicle roof of claim 8, wherein the second bearing bush has a radial collar provided between the second arm and the securing disc of the blind rivet.

14. The vehicle roof of claim 8, wherein the first and second bearing bushes each comprise at least one of a polymer material, a metal material, a composite material, and combinations thereof.

15. A vehicle, comprising:
a roof;
a rod assembly operatively configured to permit a moveable adjustment of the roof between a closed position which spans a passenger compartment of the vehicle and an open position which exposes the passenger compartment, the rod assembly including at least one articulation device having:
a first arm having a bearing connection piece;
a second arm having a stop and a bearing hole through which the bearing connection piece is configured to extend therethrough;
a rivet device configured to support the first arm and the second arm, the rivet device comprising a blind rivet and a rivet shaft which extends through the first arm and the second arm, respectively, the blind rivet having a collar configured to abut the stop and a gudgeon head configured for movement in a direction towards a shaft stop in the bearing connection piece; and
first and second bearing bushes provided between the bearing connection piece of the first arm and the bearing hole of the second arm, wherein the first and second bearing bushes have substantially the same structural dimensions.

* * * * *